United States Patent [19]
Dennison

[11] 3,874,811
[45] Apr. 1, 1975

[54] HI AND LOW TURBINE BEARING SUPPORT SYSTEM

[75] Inventor: William T. Dennison, West Hartford, Conn.

[73] Assignee: United Aircraft Corporation, East Hartford, Conn.

[22] Filed: Apr. 19, 1974

[21] Appl. No.: 462,556

[52] U.S. Cl. ................................. 415/60, 415/170
[51] Int. Cl. ............................................. F01d 1/24
[58] Field of Search............ 415/60, 61, 122, 170 R; 308/187.1, 169, 15, 121, 123, 135; 184/6.11; 60/39.16 R

[56] References Cited
UNITED STATES PATENTS

| | | | |
|---|---|---|---|
| 2,411,124 | 11/1946 | Baumann | 415/79 |
| 2,451,944 | 10/1948 | Hall | 415/79 |
| 2,852,912 | 9/1958 | Kelley | 60/39.16 R |
| 2,866,522 | 12/1958 | Morley et al. | 184/6.11 |
| 2,991,005 | 7/1961 | Hall | 415/170 R |
| 3,486,328 | 12/1969 | Boudigues | 60/39.16 |

*Primary Examiner*—Henry F. Raduazo
*Attorney, Agent, or Firm*—Charles A. Warren

[57] ABSTRACT

In a turbine structure for split turbines, a bearing support structure downstream of the turbine carries a short shaft on the low pressure turbine and a second bearing inside the short shaft supports the projecting high pressure turbine shaft. To connect the low pressure turbine shaft to the drive shaft for the low pressure compressor, this drive shaft being within and spaced from the high turbine rotor and shaft, a connecting ring is splined to the low turbine shaft and to the drive shaft where they project downstream of the bearing structure.

7 Claims, 1 Drawing Figure

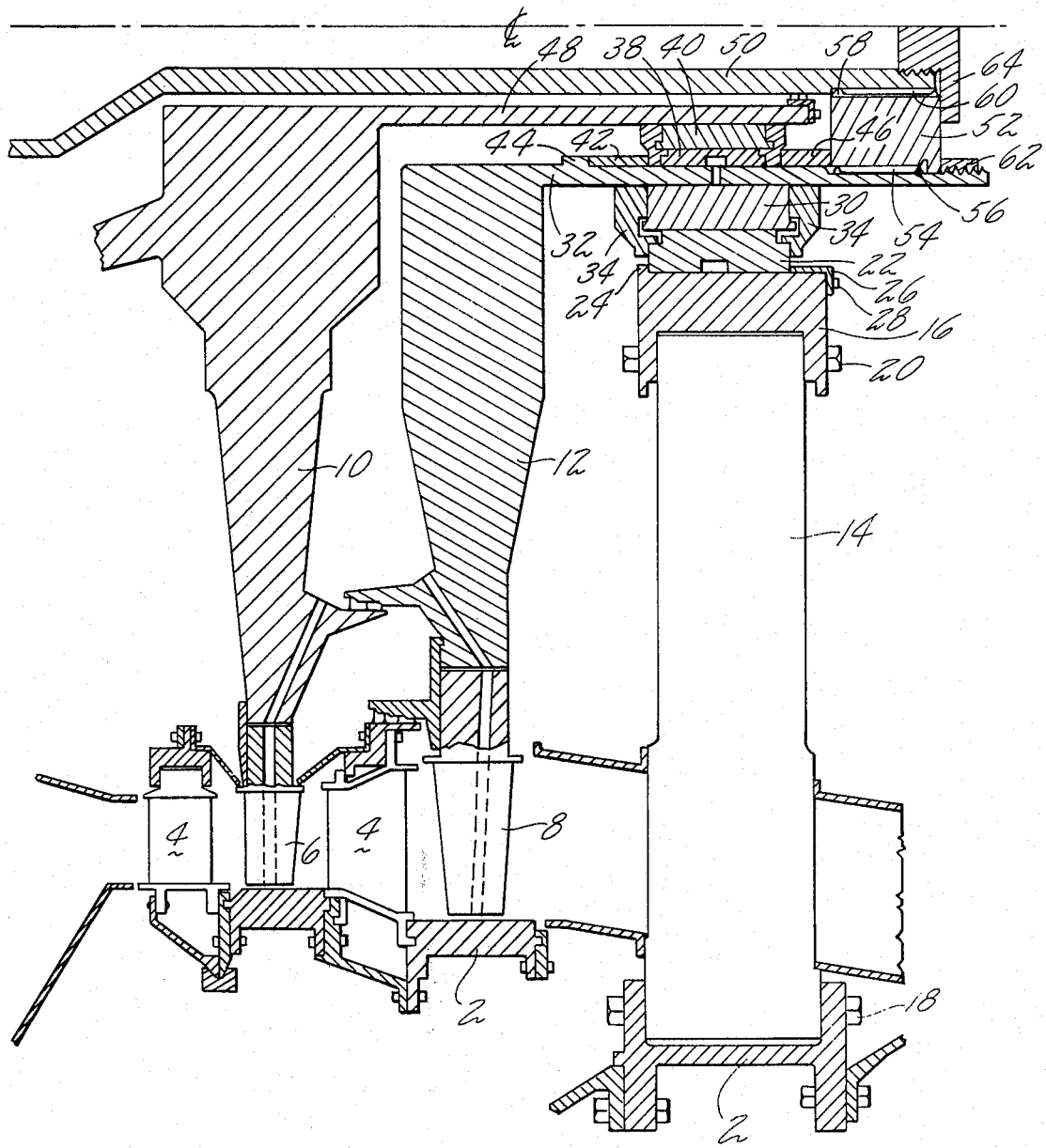

HI AND LOW TURBINE BEARING SUPPORT SYSTEM

SUMMARY OF THE INVENTION

A feature of the invention is an arrangement for journaling both high and low pressure rotors in concentric bearings downstream of the turbine assembly. Another feature is an arrangement for connecting the low pressure turbine shaft to the driving shaft from this turbine to the low pressure compressor rotor, the drive shaft being within and spaced from the turbine rotors. Another feature is an arrangement for a quick connection or disconnection of the low pressure turbine rotor from the drive shaft in assembly or disassembly of the engine.

According to the invention, the turbine rotors are both journaled in concentric bearings downstream of the turbine, each rotor having a downstream extending stub shaft journaled in one of the bearings, the stub shafts being concentric to each other and the low pressure turbine shaft surrounding the high pressure turbine shaft. The shaft on the low pressure rotor is connected to the drive shaft from said rotor to the low pressure compressor rotor which is within and concentric to the stub shafts by a connecting ring between and splined to the low turbine shaft and the drive shaft. The splined ring is releasably held in place for easy assembly or disassembly of the turbine rotors with the remainder of the engine.

Other features and advantages will be apparent from the specification and claims and from the accompanying drawing which illustrates an embodiment of the invention.

BRIEF DESCRIPTION OF THE DRAWING

The single FIGURE is a sectional view through the bearing support structure and the turbine rotors.

DETAILED DESCRIPTION OF THE PREFERRED EMBODIMENT

The gas turbine arrangement is a split turbine arrangement in which a low pressure compressor rotor is driven by a low pressure turbine rotor and a high pressure compressor rotor is separately driven by a high pressure turbine rotor generally as in the Savin U.S. Pat. No. 2,747,367. As shown the turbine includes a casing 2 having rows of turbine vanes 4 therein alternating with rows of vanes 6 and 8 on the high pressure turbine rotor 10 and low pressure turbine rotor 12. Downstream of the vanes the casing 2 supports inwardly extending struts 14 that support a bearing housing 16. Suitable bolts 18 carry the outer ends of the struts in the casing and other bolts 20 connect the inner ends of the struts to the bearing housing. This structure is described and claimed in the copending application Ser. No. 452,765 filed Mar. 19, 1974 having the same assignee as this application. The housing 16 has an outer bearing ring 22 mounted therein and held between a shoulder 24 and a clamping sleeve 26, the latter being releasably held to the housing by bolts 28. The bearing ring 22 encircles inner bearing segments 30 engaging the outer surface of the projecting stub shaft 32 on the low pressure turbine rotor 12. Suitable locating rings 34 hold the bearing segments in concentric relation.

Inside the stub shaft 32 are an outer bearing ring 38 and inner bearing segments 40, the former located between a sleeve 42 within the stub shaft 32 and engaging a shoulder 44 thereon and a second sleeve 46 held within the outer end of the shaft. The inner bearing segments 40 engage and support a stub shaft 48 on the high pressure turbine rotor, this stub shaft being concentric to and located within the stub shaft on the low pressure turbine rotor. In this way both turbine rotors are journaled downstream of the turbine structure by concentric bearings, one within the other, and one of them located between the two rotor shafts.

The high pressure turbine rotor is readily connected to the high pressure compressor rotor by a sleeve 49 extending forwardly from the high pressure turbine rotor. The low pressure turbine rotor is connected to the low pressure compressor rotor by a drive shaft 50 positioned within and concentric to the turbine rotors and extending downstream beyond the above described bearing structure. The low-pressure rotor-shaft 32 also extends downstream beyond the bearing structure, and this shaft 32 is connected to the drive shaft 50 by a splined ring 52 having splines 54 on its outer surface cooperating with splines 56 on the shaft 32 and splines 58 on its inner surface meshing with splines 60 on shaft 50. In this way a suitable drive connection is made from the turbine shaft 32 through shaft 50 to the compressor.

The ring 52 is held in position between the cooperating shafts by a threaded ring 62 engaging the end of shaft 32 and another threaded ring 64 engaging the end of shaft 50. Removal of these threaded rings permits removal of the splined ring and thereby removal of the low pressure turbine by removal of the struts above described.

Although the invention has been shown and described with respect to a preferred embodiment thereof, it should be understood by those skilled in the art that various changes and omissions in the form and detail thereof may be made therein without departing from the spirit and the scope of the invention.

Having thus described typical embodiments of my invention, that which I claim as new and desire to secure by Letters Patent of the United States is:

1. In a turbine construction for a gas turbine, a low pressure turbine rotor having a first projecting stub shaft, a high pressure turbine rotor having a second projecting stub shaft within said first shaft, a casing surrounding said turbine rotors and having a bearing support structure therein, a bearing for and surrounding said first shaft, a bearing between said shafts for and supporting said second shaft, a drive shaft positioned within and in spaced relation to said second shaft and connecting means downstream of the bearings providing a connection from said drive shaft to said first shaft.

2. A turbine construction as in claim 1 in which said connecting means includes a splined ring positioned between and splined to said drive shaft and said first shaft.

3. A turbine construction as in claim 2 in which the splined ring is held in position by a clamping ring secured to said drive shaft.

4. A turbine construction as in claim 2 in which the splined ring is held to said shafts by clamping rings connected to each of said shafts.

5. A turbine construction as in claim 1 in which the casing carries rows of turbine vanes therein located within the gas path in the turbine and the rotor have cooperating rows of blades, and the bearing support is carried by struts extending inwardly from the casing across the gas path and downstream of the vanes in the casing.

6. In a gas turbine engine, a turbine construction including a casing having a plurality of rows of turbine vanes therein, and defining a gas path through the turbine, a high pressure turbine rotor having at least one row of blades thereon positioned downstream of the first row of vanes at the inlet to the turbine, a low pressure turbine rotor having at least one row of blades thereon cooperating with one or more rows of vanes downstream of the high pressure rotor blades, each rotor having an axially extending shaft thereon, the low pressure turbine stub shaft surrounding and concentric to the high pressure rotor shaft, a bearing support structure supported by the casing downstream of the vanes therein, said support structure including struts extending inwardly from the casing across the gas path, a first bearing surrounding and supporting the low pressure shaft and carried by the support structure, a second bearing positioned between the shafts and supporting the high pressure shaft within the low pressure turbine shaft,

- a connecting shaft positioned within the high pressure shaft and rotor in radially spaced relation thereto, and
- a connecting ring positioned between the connecting shaft and the low pressure shaft downstream of the second bearing and providing a driving connection therebetween.

7. A gas turbine engine as in claim 6 in which the connecting ring is held in position between the shafts by a clamping ring engaging the downstream end of the connecting ring and releasably secured to one of said shafts.

* * * * *